Figures 1, 2:
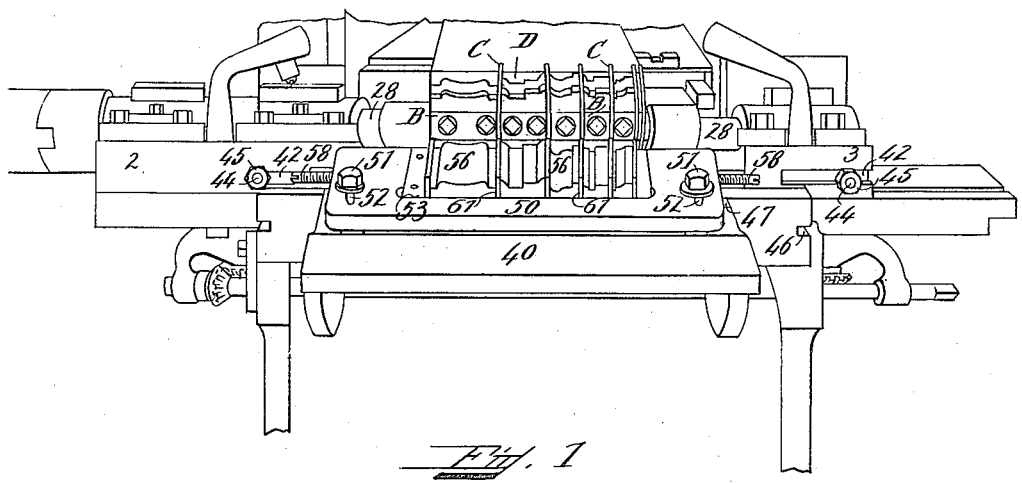

J. C. DE LANEY.
WOODWORKING MACHINERY.
APPLICATION FILED JUNE 6, 1912.

1,042,331.

Patented Oct. 22, 1912.

2 SHEETS—SHEET 1.

Witnesses:

Inventor:

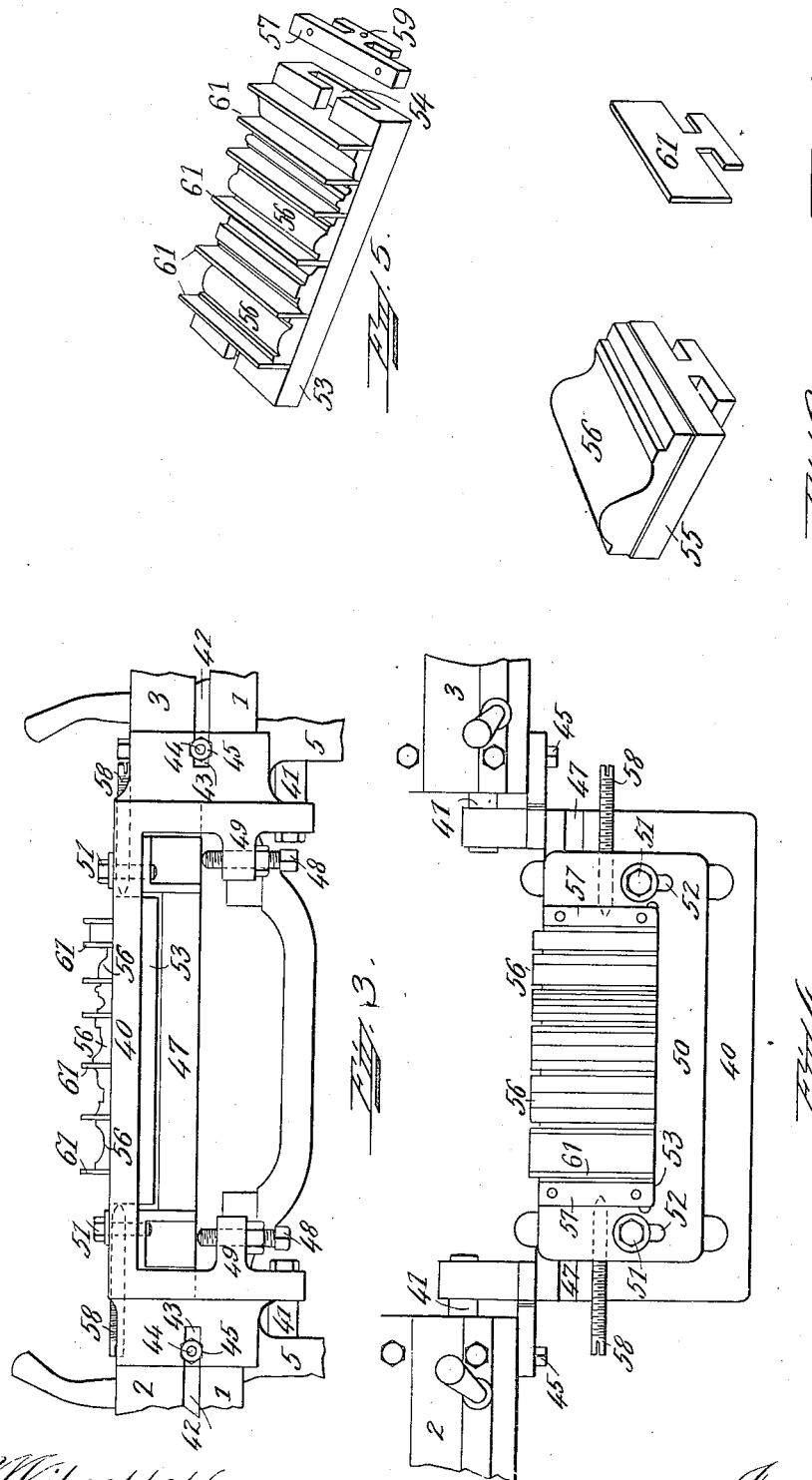

UNITED STATES PATENT OFFICE.

JOHN C. DE LANEY, OF WATERTOWN, MASSACHUSETTS.

WOODWORKING MACHINERY.

1,042,331.
Specification of Letters Patent.
Patented Oct. 22, 1912.

Original application filed April 8, 1912, Serial No. 689,103. Divided and this application filed June 6, 1912.
Serial No. 702,117.

*To all whom it may concern:*

Be it known that I, JOHN C. DE LANEY, a subject of the King of Great Britain and Ireland, residing at Watertown, in the county of Middlesex and State of Massachusetts, have invented certain new and useful Improvements in Woodworking Machinery, of which the following is a specification, reference being had therein to the accompanying drawings.

The principal object of my invention is to provide means whereby each of several strips of molding being simultaneously made out of a piece of stock, may, throughout every portion of its length, be subjected to uniform conditions at the molding head of the machine, so that when finished, it is exactly of the same size and quality of finish throughout its length.

After the strips have begun to be formed and the free ends emerge from the machine, the end portions, if they are not controlled, will move capriciously; some may approach each other, thereby causing one or more of the saws to bind, to become heated, and burned; should they happen to be supported by the top of a table which was below the plane of the bottom of any one or more of the strips of molding formed, then, the weight of so much of each molding as has been formed out of the stock being worked up, would tend to cause the bottom of the molding to drop below its plane in the machine, hence the thickness of the molding would be correspondingly reduced; and vice versa, should the table top be above the bottom plane of the molding, the molding would be thicker than intended. Also, if each strip were of different thicknesses, and the table top were of the right height for one strip, it would not be for another. Further, if the table be too far away from the molding heads, the strips will vibrate and chatter, and will interfere with the successful operation of the molding head.

Now the feature of my invention which will obviate these objections, resides in adjustable guiding and supporting devices for compelling every portion of each strip to move away from the molding head in the same straight line in which it moves into operative engagement with the molding head.

In the drawings illustrating the principle of my invention and the best known method now known to me of embodying the same in operative structure, Figure 1 is a perspective view showing my invention embodied in a molding machine, only a portion of which is illustrated; and also a method of working up stock into various forms of molding strips. Fig. 2 is an end perspective view showing my pivoted supporting bracket being dropped down out of normal position, to permit the swinging forward and back of a pivoted arbor, with molding heads and saws thereon. Fig. 3 is an elevation of the pivoted supporting bracket with various adjusting means. Fig. 4 is a plan of what is shown in Fig. 3; the arbor having been removed from the boxes. Fig. 5 is a perspective view of a frame having mounted therein guiding and supporting T-blocks and saw followers, corresponding to the saw cuts and molded surfaces in the several strips being formed out of a piece of stock; also a detail showing one of the lock blocks for securing the T-blocks and saw followers in the frame. Fig. 6 is a perspective view of one of the T-blocks; while Fig. 7 is a similar view of one of the saw followers.

In order that each strip of molding, as D, may, during its manufacture, be subjected to exactly the same conditions throughout its entire length, there is provided a bracket table 40, Figs. 1, 2, 3 and 4, movably mounted on the frame of the machine by pivots 41, Fig. 3, so that the table may be dropped down and not interfere with the swinging of a pivoted arbor 28, Fig. 1, for suitable molding heads B and saws C. This arbor although shown herein, is fully described and claimed by me in my application for United States Letters Patent, Serial No. 689,103, filed April 8, 1912. To hold the table 40 up in normal position, a lock slot 42, Figs. 1, 2 and 3, is provided in each of the arbor boxes 2, 3, and a corresponding slot 43 in each end of the table, whereby a bolt 44 and nut 45, engaging these slots, may be tightened to firmly secure the table in operative position.

Mounted in vertical slots 46, Fig. 2, in the table is an adjusting bar 47, adjusted vertically by adjusting screws 48, Fig. 3, passing through bosses 49 on the inside of the table, and engaging the under side of the bar; while resting upon the bar, is a frame 50 slidable horizontally toward or away from the molding heads upon the arbor, and capable of being fixed in any desired position, by means of binding bolts 51 engaging suitable parallel slots 52 in the frame. On the top surface of this frame 50 and parallel with the axis of the arbor is a retaining member 53, Fig. 5, having a lock slot 54 into which may be slid metal T-blocks 55, Fig. 6, and saw followers 61, Fig. 7; the T-blocks having secured to their top surfaces, wooden or metal blocks 56, each having its top surfaces in counterpart with those of the molding made by its respective molding head, as shown in Figs. 1 and 3; and the saw followers being of the same gage as the saws. Two lock blocks 57, Figs. 4 and 5, confine these T-blocks and saw followers in the retaining member 53: and the lock blocks, T-blocks, and saw followers are all bound together and adjusted in the right position transversely, and relatively to the molding heads and saws upon the arbor, by means of adjusting screws 58, in opposite sides of the frame, and having their points engage cavities 59 therefor in the outside surfaces of the lock blocks 57, Fig. 5.

The molding heads and saws shown, and forming no part of my present invention, may be like those described and claimed in United States Patent No. 999,014, granted to me July 25, 1911, and they may be secured thereon as described therein.

The stock to be cut up into strips of molding, and the number of styles of strips to be made, having been determined, suitable heads B and saws C are selected and mounted upon the arbor 28, in the way pointed out in my said application Serial No. 689,103, of which the present application is a division. Next, the bracket table 40 is lifted up about its pivot 41, Figs. 3 and 4, and secured in horizontal position by the lock bolts 45 in the lock slots 42, in the boxes, engaging the lock slots 43 in the table. Proper molding supporters 56 and saw followers 61 are then slid into the T-slot of the retaining member 53, Fig. 5, and there secured in the corresponding vertical planes of the molding heads and saws, by means of the lock blocks 57 and the adjusting screws 58. To raise or lower the supporters from one horizontal plane to another, the adjusting bolts 48 controlling the vertical movements of the bar 47 in the slot in the bracket are operated. The frame 50 may be pushed in a horizontal plane as close to the heads and saws as will prevent "chattering" of the strips, and yet will not cause interference with the heads and saws, and be there secured by the bolts 51 engaging the lock slots 52 in the frame; the pressure bars, not shown, are then adjusted in the usual manner to hold the stock down upon the molding heads as it passes over them. It will now be plain, that by compelling the strips of molding to leave the heads and saws in the same plane in which they approached them, they will be of uniform size and finish throughout their entire lengths. In fine I have described new and useful means whereby molding strips may be formed with uniformity throughout their lengths.

Desiring to protect my invention in the broadest manner legally possible, what I claim is:—

1. In a wood molding machine, means for holding a molding strip down upon a molding head; a support having a supporting surface, a counterpart of the molded surface of the strip; means for adjusting the support vertically; means to adjust the support horizontally toward or away from the molding head; means for adjusting the support parallel with the axis of the molding head.

2. A table member; a molding support, movably mounted in the table and comprising a block having its top surface a counterpart of that of the molding to be supported; a saw follower next to said block; means for binding them together; means for adjusting them transversely, in relation to the table.

3. A bracket pivoted to a molding machine; a table movably mounted in the bracket; a supporting block and a saw follower movably mounted in the table; means to adjust, in the horizontal plane of the bracket, the table toward or away from the cutter of the molding machine; means for securing the supporting block and saw follower together; means for adjusting vertically, the table in relation to the bracket.

In testimony whereof I affix my signature in presence of two witnesses.

JOHN C. DE LANEY

Witnesses:
  A. I. CRAWFORD,
  E. F. UNIAC.